United States Patent [19]

Rowland

[11] 3,901,645
[45] Aug. 26, 1975

[54] CALCINING KETTLE AND SYSTEM

[75] Inventor: George E. Rowland, Lombard, Ill.

[73] Assignee: Universal Kettle Company, Inc., Chicago, Ill.

[22] Filed: Apr. 7, 1971

[21] Appl. No.: 132,126

[52] U.S. Cl. .................. 432/16; 432/151; 432/158; 432/177; 432/178
[51] Int. Cl. ...................... F27b 15/00; F27b 15/12
[58] Field of Search ................. 263/26, 53 R, 53 A; 432/158, 151, 16; 423/177, 178

[56] References Cited
UNITED STATES PATENTS

| | | | |
|---|---|---|---|
| 444,658 | 1/1891 | Barker | 432/158 |
| 852,616 | 5/1907 | Raithel | 263/26 |
| 1,165,815 | 12/1915 | Thelen et al. | 432/151 |
| 1,547,872 | 7/1925 | Hawke | 432/158 |
| 1,746,294 | 2/1930 | Tyler | 263/53 A |
| 2,982,532 | 5/1961 | Hakes | 263/53 A |
| 3,001,780 | 9/1961 | Benson et al. | 432/158 X |
| 3,236,509 | 2/1966 | Blair | 263/53 A |
| 3,307,840 | 3/1967 | Conroy, Jr. | 432/151 |

Primary Examiner—John J. Camby
Attorney, Agent, or Firm—Hofgren, Wegner, Allen, Stellman & McCord

[57] ABSTRACT

A calcining kettle is provided with an improved heating system involving the use of flat flame burners for heating the bottom wall of the kettle and a luminous wall furnace for heating the side wall of the kettle with heat during the calcining operation. A space between the luminous wall furnace and the kettle provides an exhaust passage for combustion gases. This exhaust passage extends across the top wall of the kettle for blocking heat loss therethrough. An improved agitator is also provided which has scraper elements moving in close association with the area of the kettle bottom wall and scraper elements extending outwardly therefrom for riding in scraping relationship with the kettle bottom corner. The kettle side wall is provided with rises and depressions, such as corrugations, to increase its surface area for maximizing heat transfer from the luminous wall furnace to the materials being calcined within the kettle. The agitator includes a plurality of three rotary driven shafts aligned with their axes in a common plane. Each shaft carries impeller blades which extend to adjacent at least one of the other shafts and are axially staggered with respect to the blades thereof and is driven in a direction of rotation opposite to that of the next adjacent shaft.

The kettle includes a dust separation system for conjointly recovering dust from the feed material and steam from the kettle. The operating system also includes conduits for delivering combustion gases from the kettle heaters through a hammer mill for fluidizing comminuted feed and carrying the feed overhead for dust separation. The feed is delivered to the kettle via a surge bin which can be operated to provide batch by batch operation or continuous operation. The product can be cooled by countercurrent or cocurrent heat exchange flow with water and dust separated from the product can be collected along with the feed, dust and steam. A method of operating the system is also provided.

21 Claims, 4 Drawing Figures

3,901,645

CALCINING KETTLE AND SYSTEM

BACKGROUND OF THE INVENTION

1. Field of the Invention

This invention relates to a kettle and system for calcining solid particulate materials.

2. Brief Description of the Prior Art

Calcining kettles are in common use for calcining gypsum and like materials. Normally gypsum rock is ground up to form a powder and the powder is introduced into the calcining kettle and heat is applied to cause dehydration of the gypsum to the extent desired, with the moisture content leaving the kettle overhead in the form of steam. Synthetic or precipitated gypsum, can also be processed by grinding the filter cake and introducing it into a calcining kettle. In its free state, gypsum, whether natural rock or filter cake, contains as much as 25 percent moisture content. Initial drying produces sypsum dehydrate ($CaSO_4 \cdot 2\ H_2O$) which is considered to contain only chemically combined water. Further drying removes chemically combined water and converts the gypsum dihydrate to a betahemihydrate ($CaSO_4 \cdot \frac{1}{2} H_2O$) which is also known in the trade as "stucco," or further to one of the theoretical forms of anhydrite known in the trade as "soluble," "slightly soluble," or "insoluble" anhydrite which are also known as anhydrite I, II, and III or alpha, beta and gamma anhydrites.

Thus far in the art it has been impossible on a practical basis to derive insoluble anhydrite from a calcining kettle operation and this material is obtained through the use of rotary high temperature kilns, bee hive kilns, or by the addition or sulphuric acid to stucco in a kettle to lower the normally high temperatures required for conversion. It has also been reported that the insoluble anhydrite can be obtained by means other than thermal reduction and specifically from the manufacture of phosphoric acid. However, in kettle operations it has been extremely difficult to control the conditions to the extent which would be required to produce an insoluble anhydrite or else to reach the temperatures rrequired for such production.

SUMMARY OF THE INVENTION

The present invention provides a calcining kettle and system which is capable of excellent temperature control and is efficient with regard to conservation of heat so that it can economically produce any desired form of calcined material. The kettle utilizes a combination of flat flame burner means and a luminous wall furnace and is provided with a heat exchange passage for passing combustion gases in heat exchange with the kettle walls and across the kettle top wall, therby increasing the efficiency and heat conservation.

In a preferred system utilizing the kettle, the combustion gases are used to deliver particulate feed material for use in a kettle and deliver dust from the feed material into contact with vapors such as steam recovered from the kettle for conjoint separation of the dust and the steam.

While the present invention is susceptible of embodiment in many different forms, there is shown in the drawings, as will be described herein in detail, one form and modifications of the invention with the understanding that the present disclosure is to be considered as an exemplification of the principles of the invention and is not intended to limit the invention to the embodiment or modifications illustrated.

DESCRIPTION OF THE PREFERRED EMBODIMENT

Figure 1:
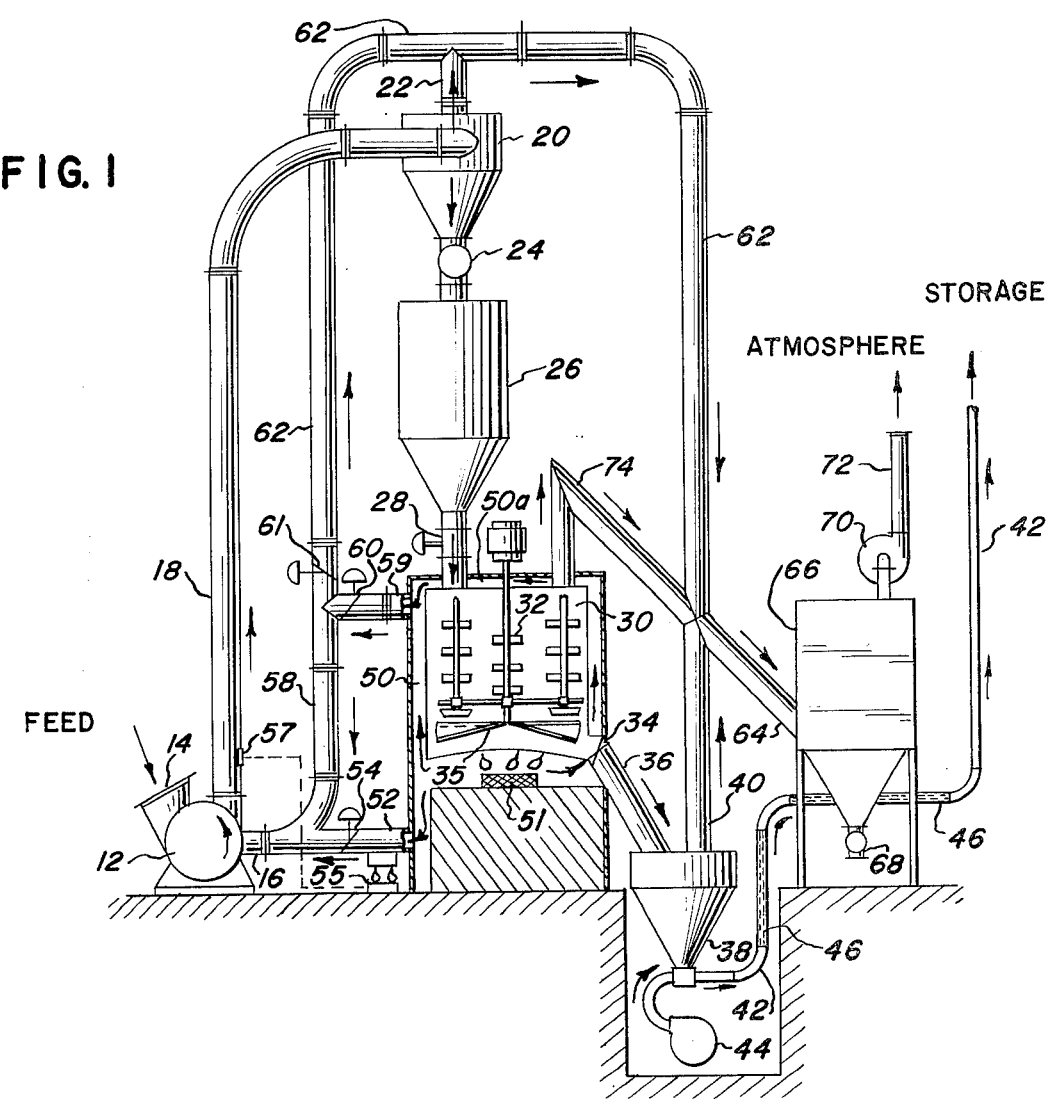
FIG. 1 is a schematic flow scheme of a calcining system of the present invention.

The calcining system illustrated in FIG. 1 will be described in regard to its operation. Feed is introduced into a hammer mill 12 via an inlet chute 14. In hammer mill 12 the gypsum feed is pulverized into a fine powder and combustion gases entering intake 16 fluidize the powder and deliver it up a lift pipe 18 into a cyclone separator 20. Fines and combustion gas leave cyclone separator 20 via overhead line 22 while the separated solid powdered gypsum is delivered via rotary feeder 24 into surge bin 26.

Once a batch-sized mass of gypsum builds up within surge bin 26, an electrical control responsive to the level of powder in surge bin 26 opens dump gate 28 and the batch is delivered into the calcining kettle 30. In kettle 30 the powder material is heated to calcining temperature while being agitated by motor-driven blades 32. Once the batch has been calcined to the proper degree, it is delivered from kettle 30 by opening dump control valve 34, and rotation of bottom agitator blade 35 eventually moves the entire batch through dump chute 36 into a hot-pit or bin 38. Vapors, such as steam, other gases and fumes are delivered overhead from bin 38 via overhead line 40, while product calcined gypsum is delivered into product take-off line 42 where it is fluidized by air from blower 44 and delivered through line 42 to a suitable storage bin (not shown). Product take-off line 42 is provided with a suitable water cooling jacket 46 for cooling the product by flow of water through the jacket countercurrent or cocurrent to the direction of the flow of the product.

The kettle 30 is provided with a double-wall construction defining a heating jacket 50 through which combustion gases from a burner 51 flow to heat the kettle 30. It should be noted that the heating jacket 50 extends across the top of the kettle 30, as at 50a. The preferred form of the kettle will be described in more detail below.

Combustion gases from heating jacket 50 are delivered through an exhaust gas line 52 and valve 54 into hammer mill intake line 16 for use in fluidizing pulverized feed. Since the temperature of the exhaust gas from heating jacket 50 may greatly fluctuate, as when the kettle is first fired up, an auxiliary burner 55 heats the exhaust gas at exhaust line 52 whenever the temperature of hammer mill 12, as indicated by a temperature sensing device 57 at lift pipe 18, falls below a preselected value, e.g., 200°–250° F, suitable for use in fluidizing the pulverized feed. Compustion gases from the burner can also be delivered to intake 16 via lines 58 and 59 and valve 60. Excess combustion gases are delivered through valve 61 and line 62 overhead to a position where line 62 receives the gases from line 22 and the combined gases are then delivered downwardly through line 62 and line 64 and into dust collector 66 from which dust can be recovered from feeder valved outlet 68. The gases from dust collector 66 are drawn overhead by blower 70 and then through vent pipe 72, as dust-free gases.

The kettle 30 is also provided with a vapor outlet line 74 through which steam produced during the calcining operation is removed from the kettle. Line 74 delivers the steam to the junction of lines 40 and 62 so that the combined vapors and gases from lines 40, 62 and 74 are directed through line 64 into the dust collector 66. The presence of vapor from line 74 assists in separating the dust from the gases within the dust collector. The blower 70 provides whatever additional draft is needed for moving the fluidized dust through the system.

Figure 4:
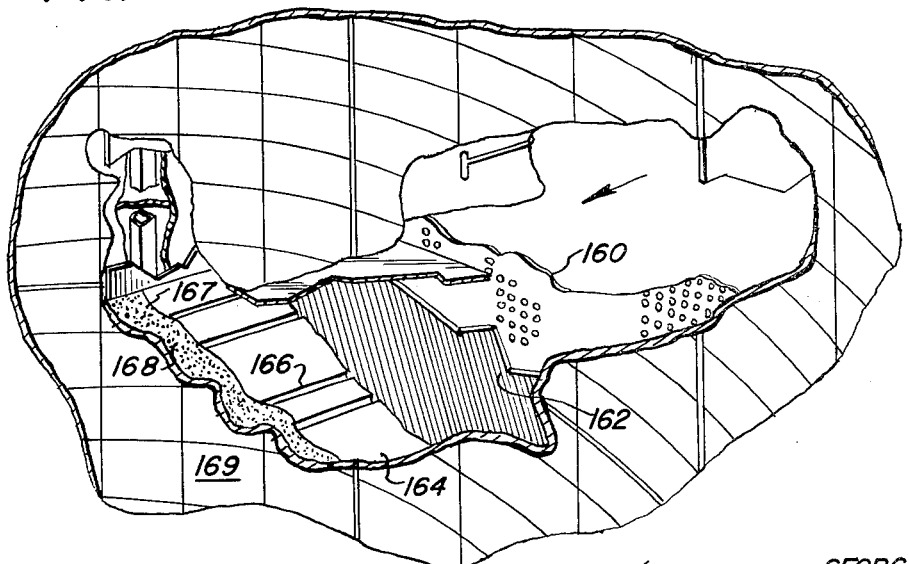
FIG. 4 is a perspective view, partially in section, of a portion of a luminous wall furnace used in the kettle of FIGS. 2 and 3.
Figure 2:
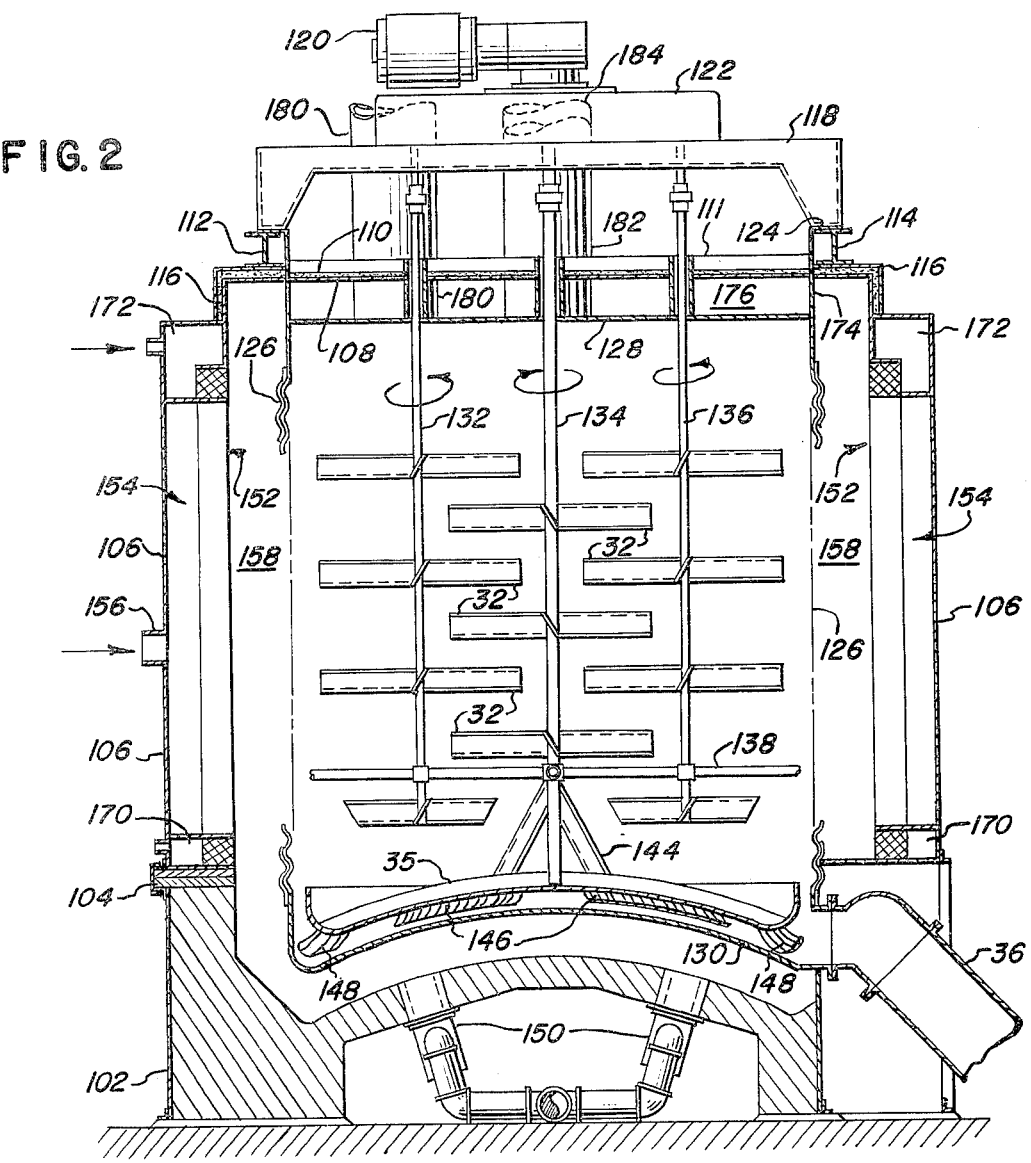
FIG. 2 is a vertical section through a preferred calcining kettle.
Figure 3:
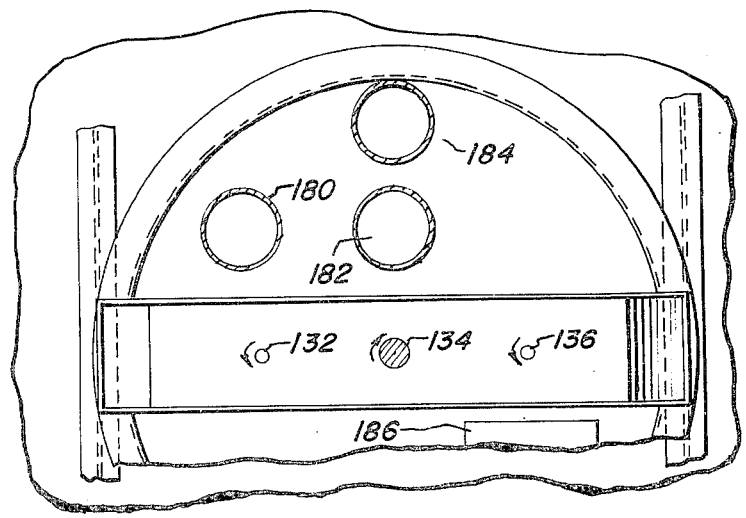
FIG. 3 is a top view of the kettle of FIG. 2 with an electric motor and gear box removed.

Turning now to FIGS. 2 through 4 there is illustrated a preferred form of the present calcining kettle. The device has a ring foundation 102, upon which is laid two layers of ceramic insulation 104 between the ring foundation 102 and a kettle shell 106 which rests thereon and is closed at the top by a cover plate 108 having an outer layer of ceramic insulation 110. A layer of poured insulating cement 111 is provided over the insulation layer 110 to provide further heat insulation for cover plate 108. Overhead I-beams 112 and 114 are supported by suitable posts and help support the kettle structure. A layer of insulation 116 is also provided between the I-beams 112 and 114 and the cover plate 108. Supported on and spanning the space between the parallel I-beams 112 and 114 is a bridge structure 118 which, in turn, supports a gear box 122 and electric motor 120. The electric motor is a variable speed motor and the gear box 122 is a Hamilton triple-action gear box which has been redesigned for the functions described herein.

An upper circular flange 124 also rests on I-beams 112 and 114 to support the kettle reaction chamber walls including a corrugated cylindrical side wall 126, a reaction chamber top wall 128 and a convex reaction chamber bottom wall 130. It will be noted that the side wall 126 extends upward beyond its corrugated portion and is connected with the circular flange 124 to suspend the reaction chamber walls within the kettle. Preferably, the bottom wall is fabricated to close tolerances and for this purpose it can be made of spun steel.

Three driven shafts 132, 134 and 136 extend downwardly from gear box 122 through insulating sleeves extending through kettle cover plate or top wall 108 and reaction chamber top wall 128 and are journaled near their lower ends through a stabilizing bar 138. Each of the shafts 132, 134 and 136 has a series of bladed propellers or agitator blades 32 for propelling and fluidizing particles within the kettle. The propellers are arranged to drive materials downward during rotation of the shafts. With reference to FIG. 3, shafts 132 and 136 are driven in a counterclockwise direction while shaft 134 is driven in a clockwise direction. The blades or propellers 32 on shafts 132 and 136 are at the same levels, while the blades or propellers 32 on shaft 143 are staggered intermediate the blades or propellers on the other shafts. This blade arrangement permits intimate and forceful mixing within the kettle and the variable speed drive permits application of increased torque when needed to move the blades through the material as the material thickens in passing from one chemical state to another.

A large bottom blade 35 is carried on the lower end of shaft 134 and is supported in close conformity with bottom wall 130 of the reaction chamber by support arms 144. Bottom blade 35 has bottom scrapers 146 and end scrapers 148 which ride closely spaced from the bottom wall during rotation of shaft 134 to prevent buildup of a thick layer of gypsum in the bottom of the kettle which may otherwise impede movement of bottom blade 35 or block the spinning to dump chute 36.

THe bottom wall 130 is directly heated by dual fuel, flat flame burners 150. THe combustion gases from the burners 150 flow through the furnace chamber 158 and through the dry exhaust plenum 176 to be exhausted through port 182, e.g., into line 52 in the system of FIG. 1. THe corrugations in reactor chamber side wall 126 increase the surface area of the reaction chamber wall and thereby increase the amount of heat transmitted therethrough into the reaction chamber.

For heating the corrugated side wall 126 of the reaction chamber, there is provided a luminous wall furnace indicated in FIG. 2 generally by reference numeral 152. The luminous wall furnace is cylindrical in shape and is positioned spaced between the reaction chamber side wall 126 and the kettle shell or jacket 106 to define an air gas plenum 154 having an inlet 156 as a separate chamber from the furnace chamber 158. As seen in FIG. 4, the luminous wall furnace 152 includes a perforated outer support plate 160 which overlies a metal screen 162 which functions as a fire check in case the blower supplying mixed gas and air through port 156 should fail. The metal screen 162 is held by the perforated plate 160 against a layer of fire brick 164 having holes 166 drilled therethrough. On the inner surface of the fire brick 164 there is provided a layer of special uniform porosity brick 168. In operation of the luminous wall furnace, fuel and air is delivered into the plenum or manifold 154. The air and gas mixture passes through the perforations in plate 160, thence through the metal screen 162 and bores 166 and enters the rear surface 167 of the special porous brick 168 to the firing face 169 of porous brick 168. On firing face 169 the gas and fuel mixture burns in many tiny flames, producing radiant heat at rates from near zero to 100,000 BTU per hour per square foot. While the air/gas mixture is passing through the pores in the brick it receives additional mixing and is preheated by heat that would normally be wasted as wall loss. In addition, the air/gas mixture cools the brick behind the firing face so that only a very thin layer of the face of the brick is at elevated temperature. A firing face temperature of 2,800°F. is attainable within 2 ½ to 10 minutes after start up. Radiant heat from the luminous wall furnace heats the reaction chamber side wall 126 to operating temperature, e.g., 1600°F.

Above and below the luminous wall furnace 152 there are provided cooling air chambers or jackets 170 and 172 through which air is delivered to assure that the outer surface of shell 106 is cool from the top to the bottom thereof.

The upper extension of side wall 126, which is connected with circular flange 124, is perforated where it spans walls 108 and 128, as at 174. This opens the space between walls 128 and 108 to flow communication with the furnace chamber 158 providing a dry exhaust plenum 176 in which combustion gases are collected for discharge through combustion exhaust 182. Since hot gases are present in plenum 176, heat loss from the reaction chamber through wall 128 is minimized.

The device illustrated in FIGS. 2 through 4 can readily be incorporated into a system such as that shown in FIG. 1. The device is provided with an inlet tube 180 for receiving feed material through dump gate 28 and with a kettle steam exhaust tube 184 which can be connected to conduit 74 in FIG. 1. Combustion exhaust gases from outlet 182 can be readily diverted into exhaust gas line 52. A man hole 186 is provided for entry into the kettle for repair or cleaning purposes.

I claim:

1. A device for calcining particulate material comprising a kettle having a side wall and a bottom wall, means for agitating the particulate material in the kettle, flat flame burner means for heating the bottom wall, and a luminous wall furnace surrounding and facing the side wall for heating the side wall with radiant heat, said luminous wall furnace including a porous material having a firing surface facing said side wall at which combustion takes place to generate principally radiant energy to be directed toward said side wall and a manifold on the side of said surface opposite said side wall for receiving an air-gas mixture and applying the mixture to said porous material for flow therethrough to said firing surface.

2. The device of claim 1 wherein said luminous wall furnace is spaced from the side wall forming an exhaust passage between the furnace and the side wall for combustion gases from the flat flame burner.

3. The device of claim 2 in which said kettle has a top wall and including means defining a heat exchange chamber in heat transmitting association with the top wall for receiving combustion gases from said exhaust passage.

4. The device of claim 1 wherein the bottom wall is convex and said agitating means includes scraper means driven in scraping association with the bottom wall and at the juncture of the bottom wall with the side wall.

5. The device of claim 1 wherein said side wall contains rises and depressions increasing its surface area.

6. The device of claim 5 wherein said side wall is corrugated.

7. In a calcining kettle having a side wall, a convex bottom wall, and a discharge port at about the juncture of the bottom and side walls, agitator means comprising blade means having a lower surface spaced from but generally conforming to the surface of the kettle bottom wall, said blade means having upturned elements at the ends thereof spaced from the side wall, first scraper means extending from the bottom of the blade means in close scraping association with the kettle bottom wall, and second scraper means at each end of the blade means extending approximately from the upturned elements outward toward the juncture of the bottom and side walls.

8. A device for calcining particulate material comprising a kettle, means for heating the kettle and agitator means for agitating particulate material in the kettle during heating, said agitator means comprising a plurality of at least three driven shafts mounted for rotation through the top wall, and blade means on each shaft extending to adjacent at least one of the other shafts and axially staggered with respect to the blade means on the other shaft and overlapping the blade means thereon.

9. The device of claim 8 including a stabilizer bar extending across the kettle adjacent the lower ends of the shafts, and means mounting the shafts on the stabilizer bar for rotation relative thereto whereby the shafts are prevented from bending during rotation.

10. The device of claim 9 wherein said shafts have approximately coplanar axes and said stabilizer bar is a straight bar intersecting said axes.

11. The device of claim 8 including variable speed drive means for driving each shaft in an opposite direction of rotation from that of the shaft next adjacent thereto.

12. The device of claim 8 wherein the blade means on each shaft are disposed for delivering air in a downward direction for fluidizing the particulate material at the bottom of the kettle.

13. A calcining system for calcining particulate material comprising a calcining kettle, means for heating said kettle, means for separating dust from the particulate material to be calcined, means for delivering the particulate material from the dust separation means to the kettle, means for recovering product calcined material from the kettle, means for recovering vapors or steam from the kettle, and means for combining the steam and separated dust and for collecting the same.

14. The system of claim 13 including means for separating dust from the product and for combining it with the steam and other separated dust.

15. The system of claim 13 wherein the heating means comprises burner means for producing combustion gases.

16. The system of claim 12 including a hammer mill for grinding the material to be calcined, means for directing combustion gases to the haammer mill for fluidizing ground material and delivering it to the dust separating means and for delivering the dust from the dust separating means into combination with the steam and thence to the dust collecting means.

17. The system of claim 16 wherein the means for separating dust is a cyclone and including a surge bin for receiving particulate material from the cyclone, and dump gate means for delivering the particulate material from the surge bin to the kettle.

18. The system of claim 13 including heat exchange means for cooling the calcined product.

19. A method of calcining particulate material which comprises delivering said material to a calcining kettle, heating the material in the kettle, recovering calcined product from the kettle, recovering steam from the kettle, separating dust from said materials, combining the recovered steam and separated dust, collecting the same and further including the step of separating dust from the recovered product and combining with the steam and dust from the feed.

20. A method of calcining particulate material which comprises delivering said material to a calcining kettle, heating the material in the kettle, recovering calcined product from the kettle, recovering steam from the kettle, separating dust from said materials, combining the recovered steam and separated dust, collecting the same and further including the step of comminuting the feed material and fluidizing it with combustion gases from the heating means for delivery to the dust separating means.

21. The method of claim 19 including the step of passing the product calcined material in heat exchange flow with water for cooling the product.

* * * * *